United States Patent
Ronning (10) Patent No.: US 11,519,552 B1
(45) Date of Patent: Dec. 6, 2022

(54) VEHICLE DRIVELINE COMPONENT HAVING A LUBRICATION DE-AERATOR

(71) Applicant: AMERICAN AXLE & MANUFACTURING, INC., Detroit, MI (US)

(72) Inventor: Jeffrey J. Ronning, Grosse Pointe Farms, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/725,656

(22) Filed: Apr. 21, 2022

(51) Int. Cl.
  *F16N 39/00* (2006.01)
  *B01D 19/00* (2006.01)
  *F16H 57/04* (2010.01)
  *B60K 1/00* (2006.01)
  *F16H 57/02* (2012.01)

(52) U.S. Cl.
  CPC ....... *F16N 39/002* (2013.01); *B01D 19/0042* (2013.01); *B60K 2001/001* (2013.01); *F16H 57/0457* (2013.01); *F16H 57/0483* (2013.01); *F16H 2057/02034* (2013.01); *F16H 2057/02052* (2013.01)

(58) Field of Classification Search
  CPC .............. F16N 39/002; B01D 19/0042; B60K 2001/001; F16H 57/0457; F16H 57/0483; F16H 2057/02034; F16H 2057/02052
  USPC ........................................................ 475/160
  See application file for complete search history.

(56) References Cited

U.S. PATENT DOCUMENTS

| | | | | |
|---|---|---|---|---|
| 4,713,982 A | * | 12/1987 | Fluegel | F16H 47/04 60/788 |
| 4,981,113 A | * | 1/1991 | Kannan | B01D 19/0047 122/492 |
| 5,776,229 A | * | 7/1998 | Blanes | F01D 25/18 96/216 |
| 6,079,372 A | * | 6/2000 | Bekedam | B01D 19/001 96/219 |
| 7,115,059 B2 | | 10/2006 | Petruska et al. | |
| 8,475,314 B2 | | 7/2013 | Corless et al. | |
| 8,512,193 B1 | | 8/2013 | Hilker et al. | |
| 8,529,657 B2 | | 9/2013 | Kincaid et al. | |
| 9,249,873 B2 | | 2/2016 | Pump et al. | |
| 9,259,967 B2 | | 2/2016 | Marsh | |

(Continued)

OTHER PUBLICATIONS

"Cyclone Dirt-Trap" that is depicted in the print out of web page https://www.chemicalguys.com/dirt-trap/dirt-trap.html?gtmListValue=Category%3A%20wash-accessories.

*Primary Examiner* — Colby M Hansen
(74) *Attorney, Agent, or Firm* — Burris Law, PLLC (57) ABSTRACT

A vehicle driveline component with a housing, a rotary power transmission system, a lubricant and a lubrication de-aerator. The housing defines a cavity and a sump. The rotary power transmission system is received in the cavity and includes a plurality of gears that are in meshing engagement. The lubricant is received in the sump and is employed to lubricate the rotary power transmission system. The lubrication de-aerator is received in the housing and has at least one matrix of de-aeration cells that extend between an upper surface and a lower surface. Each of the de-aeration cells has a cell inlet, which is formed through the upper surface, and a cell outlet that is formed through the lower surface. Each of the de-aeration cells tapers between its cell inlet and its cell outlet.

18 Claims, 6 Drawing Sheets

(56) References Cited

U.S. PATENT DOCUMENTS

| | | |
|---|---|---|
| 10,487,889 B2 | 11/2019 | Valente et al. |
| 2007/0151922 A1 | 7/2007 | Mian |
| 2010/0304914 A1 | 2/2010 | Barrett et al. |
| 2020/0227964 A1 | 7/2020 | Ronning et al. |

* cited by examiner

VEHICLE DRIVELINE COMPONENT HAVING A LUBRICATION DE-AERATOR

FIELD

The present disclosure relates to a vehicle driveline component having a lubrication de-aerator.

BACKGROUND

This section provides background information related to the present disclosure which is not necessarily prior art.

Vehicle driveline components, such as axle assemblies, transfer cases, power take-off units and electric drive modules, have rotary power transmission systems that can include one or more sets of meshing gears. The internal lubrication of a vehicle driveline component can be important for extending the longevity of the vehicle driveline component, and can help to reduce wear, heat and noise and vibration. Splash lubrication is relatively common in vehicle driveline components such as axle assemblies and power take-off units, while pressure-feed lubrication is commonly employed in vehicle driveline components such as transfer cases and electric drive units. Splash lubrication entails the rotation of a component of the vehicle driveline component through the lubricant that is held in an internal sump. Lubricant clings to the rotating component as it rotates through the sump and is later slung from the rotating component due to centrifugal force. The slung lubricant can be slung onto or drain onto other components that need lubrication. In contrast, pressure-feed lubrication employs a pump to provide pressurized fluid to the various components that are to be lubricated. The pump can discharge pressurized lubricant to one or more galleries within the vehicle driveline component.

Regardless of whether splash lubrication or pressure-feed lubrication is employed, the lubricant in a vehicle driveline component frequently comes into contact with various rotating components before it drains back to the sump. Due to the relatively high rotational speeds of the rotating components in the vehicle driveline component, it is extremely likely that air can be entrained into the lubricant as the rotating components contact the lubricant and/or in a situation where lubricant is slung from a rotating component into the lubricant in the sump of the vehicle driveline component. Entrained air in the lubricant can reduce the film strength of the lubricant, which can degrade the performance of the lubricant, can increase the likelihood of cavitation in a pump, which can increase wear of the pump, and can reduce the rate by which heat can be rejected into the lubricant. It is desirable that the lubricant that is being returned to the sump have as little velocity as possible to promote the de-entrainment of air in the lubricant. In situations where lubricant is slung into or surges with the lubricant in the sump, the slung and/or surging lubricant increases the kinetic energy of the lubricant in the sump, which can impair the effectiveness by which air is de-entrained from the lubricant in the sump.

Accordingly, there is a need in the art for a lubricant de-aeration system that can be readily integrated into a vehicle driveline component.

SUMMARY

This section provides a general summary of the disclosure, and is not a comprehensive disclosure of its full scope or all of its features.

In one form, the present disclosure provides a vehicle driveline component that includes a housing, a rotary power transmission system, a lubricant and a lubrication de-aerator. The housing has a plurality of internal surfaces and defines a cavity and a sump. The rotary power transmission system is received in the cavity and includes a plurality of gears that are in meshing engagement. The lubricant is received in the sump and is employed to lubricate the rotary power transmission system. The lubrication de-aerator is received in the housing at a location that receives lubricant slung from the rotary power transmission system. The lubrication de-aerator has at least one matrix of de-aeration cells that extend between an upper surface and a lower surface. Each of the de-aeration cells has a cell inlet, which is formed through the upper surface, and a cell outlet that is formed through the lower surface. Each of the de-aeration cells tapers between its cell inlet and its cell outlet.

In some forms, the lubrication de-aerator has a plurality of matrices of de-aeration cells and the matrices of de-aeration cells are spaced vertically from one another. Optionally, vertically adjacent matrices of de-aeration cells are offset from one another such the cell outlets of each pair of vertically adjacent matrices are not vertically in-line with one another. Also optionally, each of the de-aeration cells has a longitudinal axis, and each of the matrices are offset from one another such the cell inlets of each pair of vertically adjacent matrices are not vertically in-line with one another.

Optionally, the vertically adjacent matrices of de-aeration cells are spaced apart by a plurality of legs, each of the legs having a first end, which is received into a leg aperture formed into a first one of the matrices of de-aeration cells, and second end that is received into an associated one of the de-aeration cells in a second one of the matrices of de-aeration cells. Optionally, the second end of each of the legs contacts an interior surface of an associated one of the de-aeration cells and wherein at least one drain channel is formed between the second end and the interior surface that permits the lubricant to drain around the second end to the cell outlet of the associated one of the de-aeration cells.

In some forms, the each of the de-aeration cells has a longitudinal axis, and wherein each of the de-aeration cells has a non-circular cross-sectional shape in a cross-section taken perpendicular to the longitudinal axis. Optionally, the non-circular cross-sectional shape is hexagonal.

In some forms, at least one of the plurality of gears rotates through the lubricant in the sump during operation of the vehicle driveline component.

In some forms, the vehicle driveline component further includes an electric motor received in the housing, the electric motor having a motor output shaft, and wherein one of the plurality of gears is coupled to the motor output shaft for rotation therewith.

In some forms, the rotary power transmission system includes a differential assembly.

In another form, the present disclosure provides a vehicle driveline component that includes a housing, a rotary power transmission system, a lubricant and a lubrication de-aerator. The housing defines a cavity and a sump. The rotary power transmission system is received in the cavity and includes a plurality of gears that are in meshing engagement. The lubricant is received in the sump and is employed to lubricate the rotary power transmission system. The lubrication de-aerator is received in the cavity and includes a plurality of matrices of de-aeration cells that are spaced vertically apart from one another. Each matrix of de-aeration cells has a plurality of de-aeration cells that extend between an upper surface and a lower surface. Each of the de-aeration cells has a cell inlet, which is formed through the upper surface, and a cell outlet that is formed through the lower surface. Each of the de-aeration cells tapers between its cell inlet and its cell outlet. Vertically adjacent matrices of de-aeration cells are offset from one another such the cell outlets of each pair of vertically adjacent matrices are not vertically in-line with one another. Each of the de-aeration cells has a longitudinal axis, and each of the matrices are offset from one another such the cell inlets of each pair of vertically adjacent matrices are not vertically in-line with one another. Each of the de-aeration cells has a non-circular cross-sectional shape in a cross-section taken perpendicular to the longitudinal axis.

In some forms, the vertically adjacent matrices of de-aeration cells are spaced apart by a plurality of legs, each of the legs having a first end, which is received into a leg aperture formed into a first one of the matrices of de-aeration cells, and second end that is received into an associated one of the de-aeration cells in a second one of the matrices of de-aeration cells. Optionally, the second end of each of the legs contacts an interior surface of an associated one of the de-aeration cells and wherein at least one drain channel is formed between the second end and the interior surface that permits the lubricant to drain around the second end to the cell outlet of the associated one of the de-aeration cells.

In some forms, the non-circular cross-sectional shape is hexagonal.

In some forms, the at least one of the plurality of gears rotates through the lubricant in the sump during operation of the vehicle driveline component.

In some forms, the vehicle driveline component includes an electric motor that is received in the housing. The electric motor has a motor output shaft, and one of the plurality of gears is coupled to the motor output shaft for rotation therewith.

In some forms, the rotary power transmission system includes a differential assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
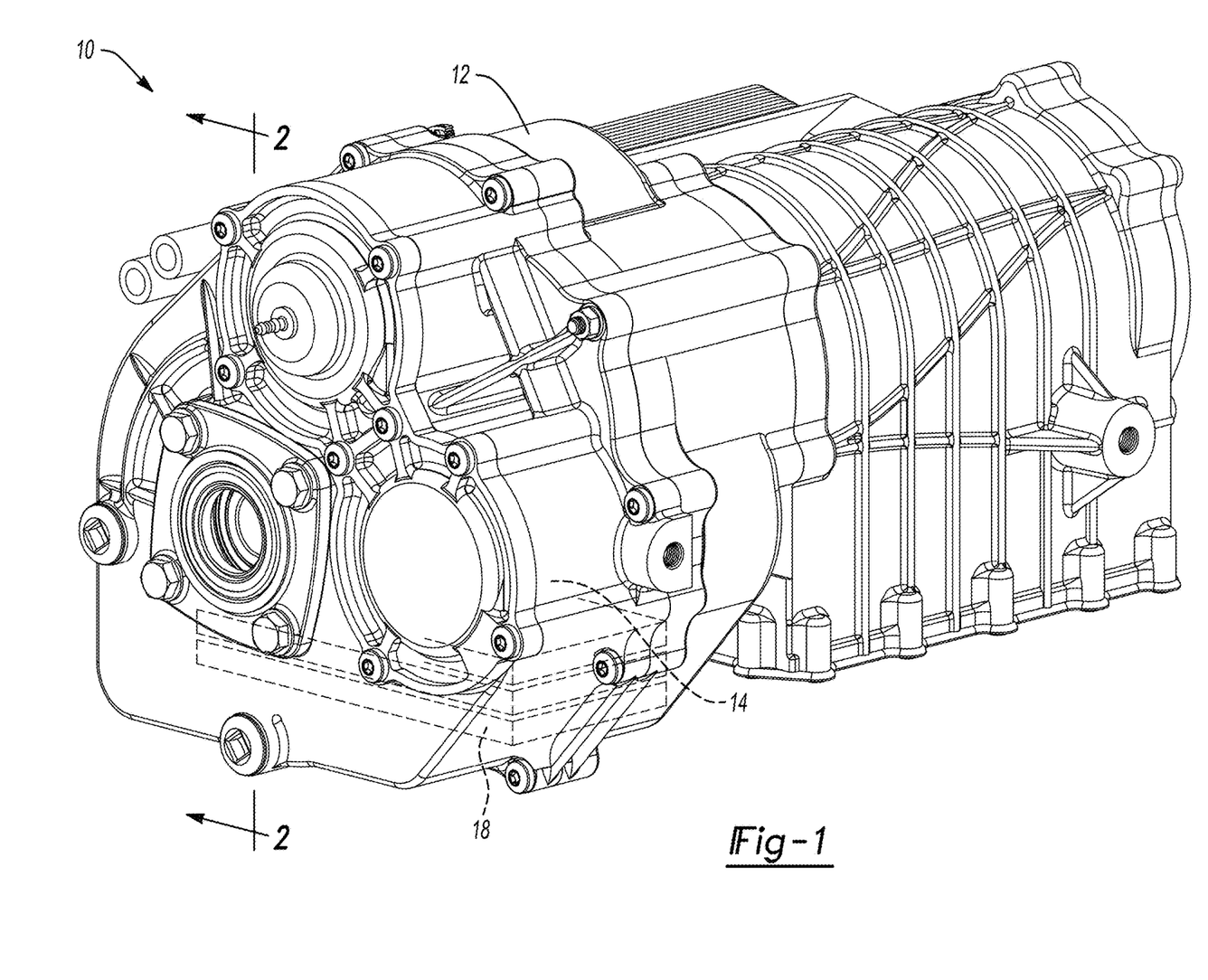
FIG. 1 is a perspective view of an exemplary vehicle driveline component constructed in accordance with the teachings of the present disclosure.
Figure 2:
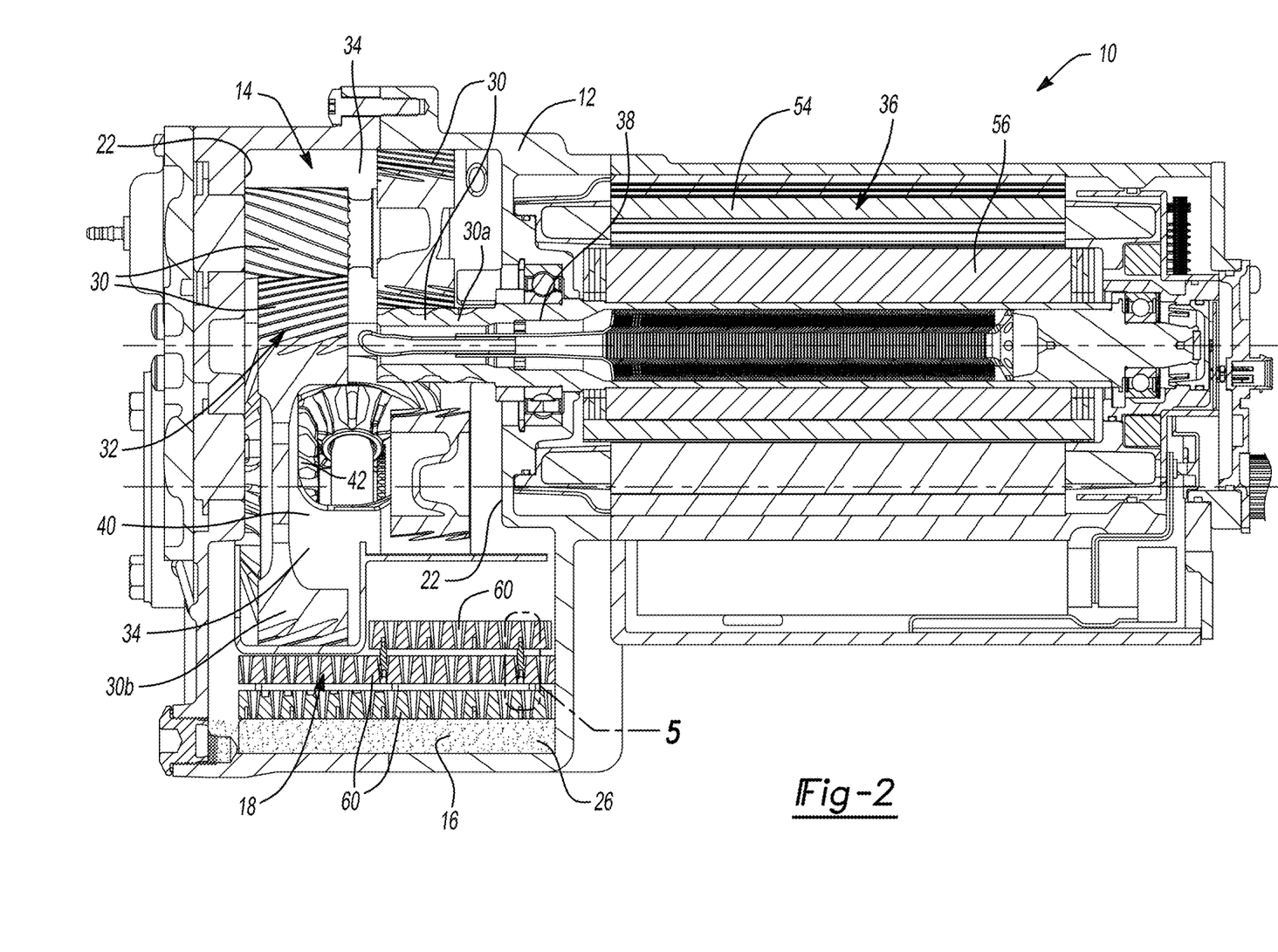
FIG. 2 is a longitudinal cross-sectional view of the vehicle driveline component of FIG. 1.
Figure 3:
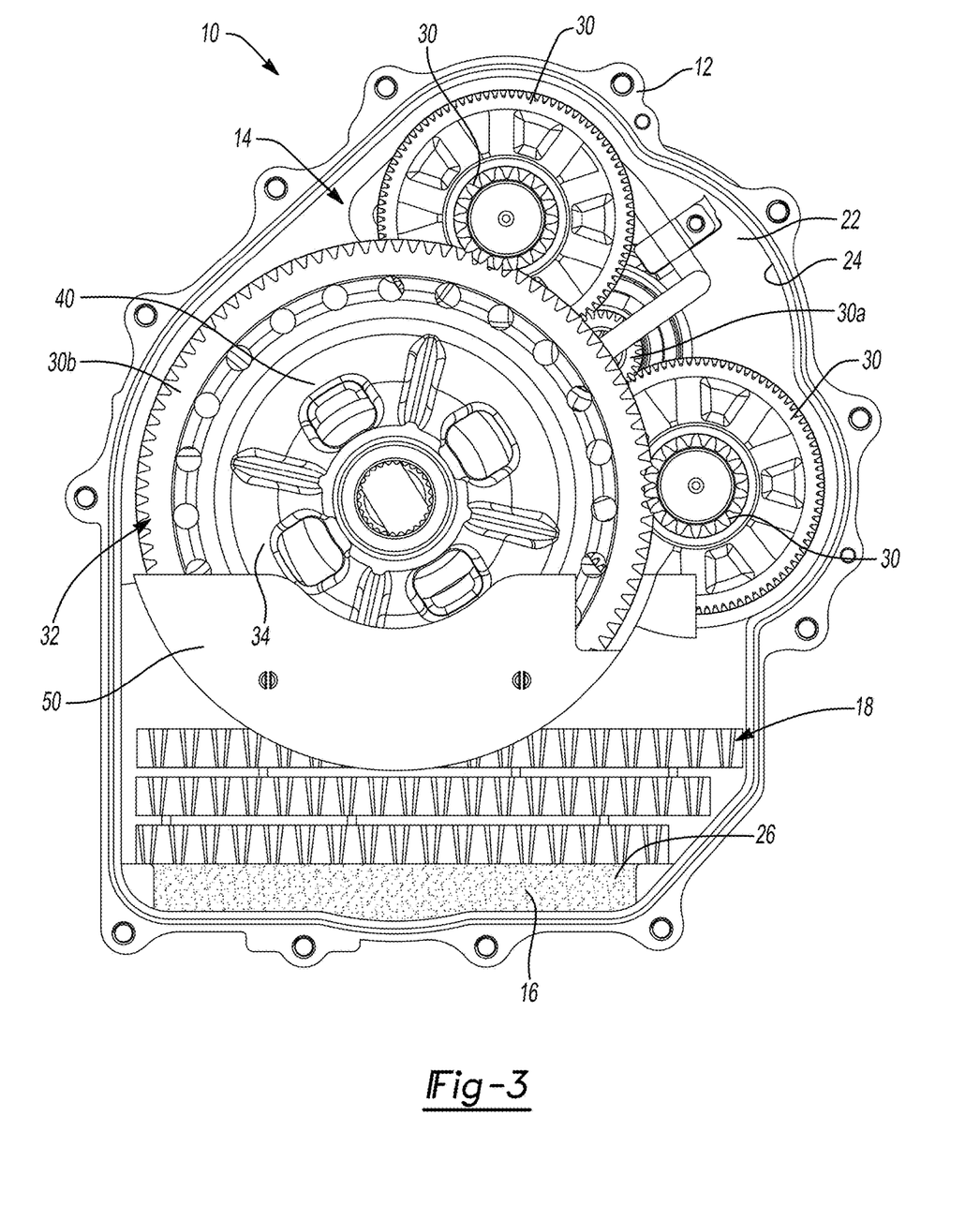
FIG. 3 is a lateral cross-sectional view of the vehicle driveline component of FIG. 1.
Figure 4:
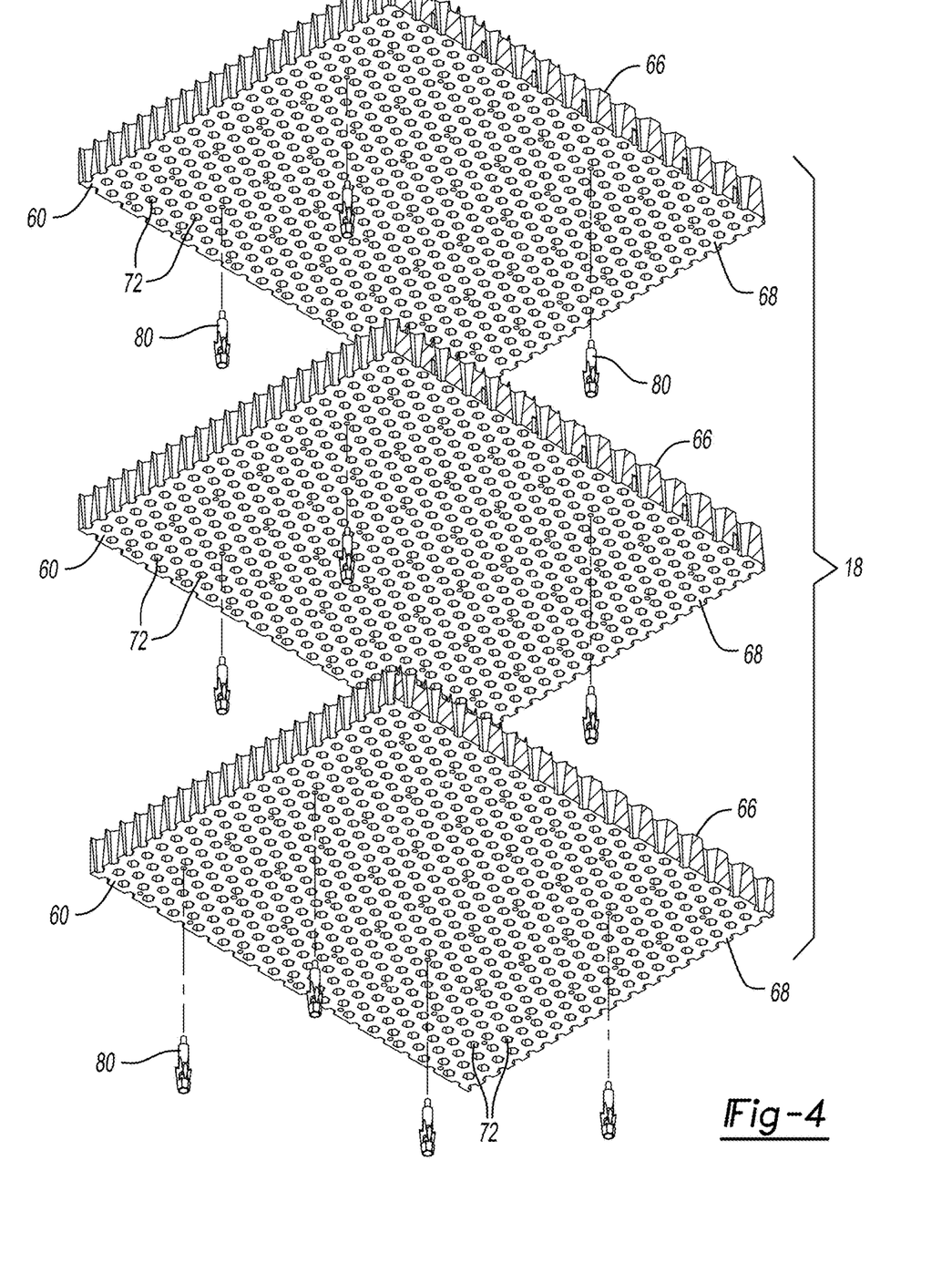
FIG. 4 is an exploded perspective view of a portion of the vehicle driveline component of FIG. 1, illustrating a lubrication de-aerator in more detail.
Figure 5:
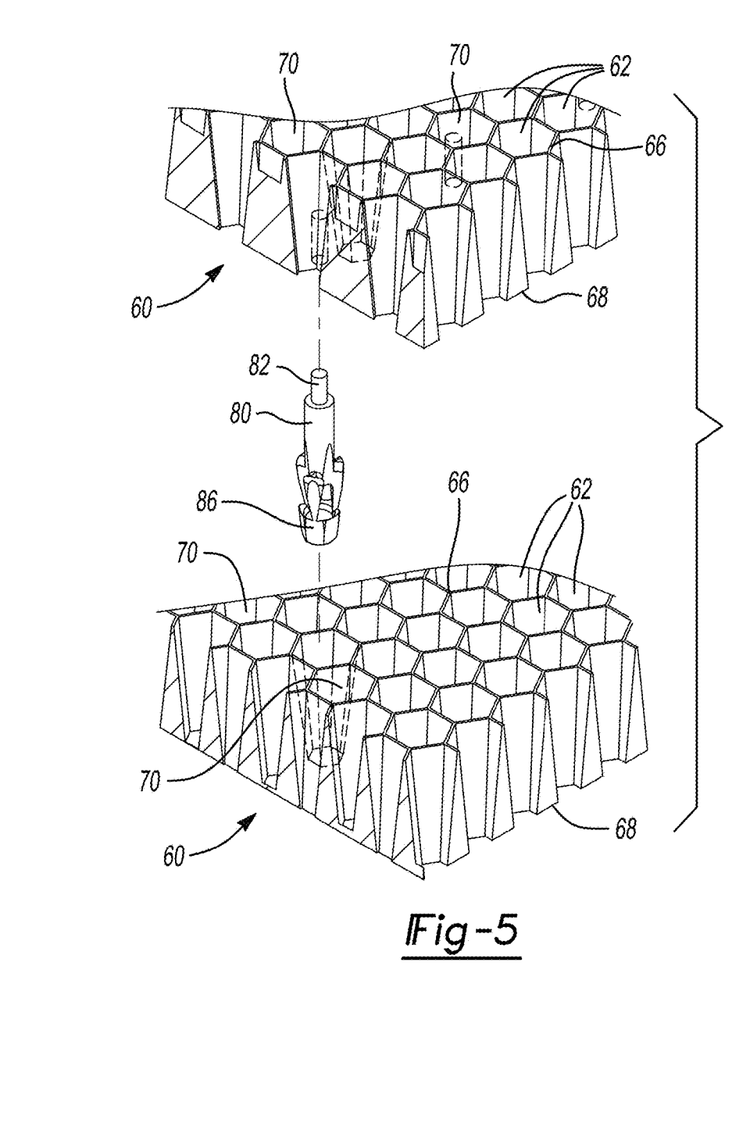
FIG. 5 is an exploded perspective view of a portion of the lubrication de-aerator of FIG. 4.
Figure 6:
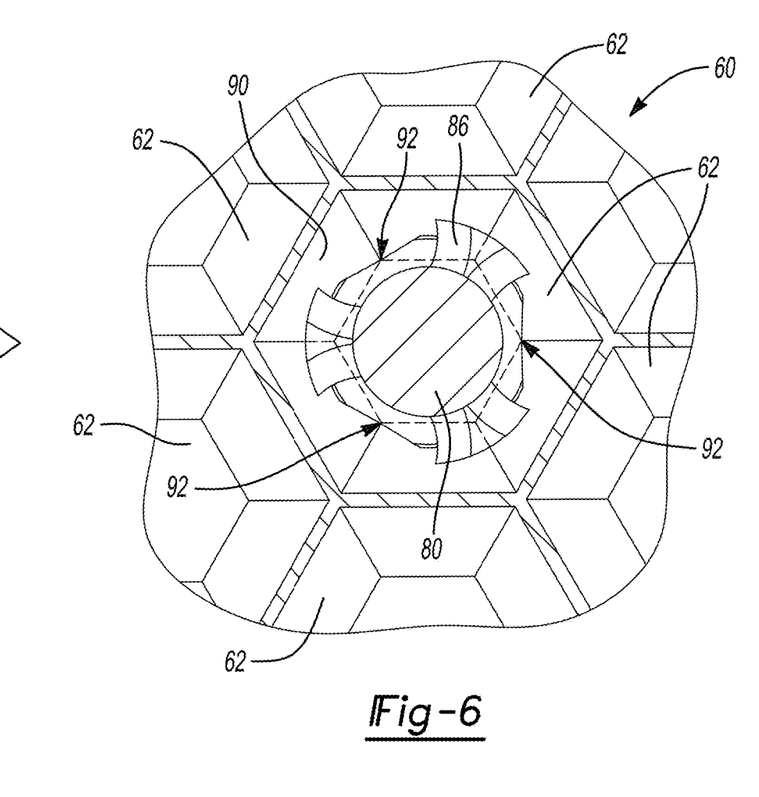
FIG. 6 is a section view taken through the lubrication de-aerator, illustrating a leg mounted in a matrix of de-aeration cells.

With reference to FIGS. 1 through 3, a vehicle driveline component constructed in accordance with the teachings of the present disclosure is generally indicated by reference numeral 10. In the example provided, the vehicle driveline component 10 is an electric drive unit, but it will be appreciated that the vehicle driveline component 10 could be an axle assembly, a transfer case, a power take-off unit, or any other type of vehicle driveline component. The vehicle driveline component 10 can include a housing 12, a rotary power transmission system 14, a lubricant 16 and a lubrication de-aerator 18.

With reference to FIGS. 2 and 3, the housing 12 can have a plurality of internal surfaces 22 and can define a cavity 24 and a sump 26. The rotary power transmission system 14 is received in the cavity 24 and includes at least one pair of meshing gears 30. Optionally, the rotary power transmission system 14 can include other components, such as a differential assembly. In the example shown, the rotary power transmission system 14 includes a transmission 32 and a differential assembly 34, and the vehicle driveline component 10 further includes an electric motor 36 that is housed in the housing 12 and drives the transmission 32. More specifically, the electric motor 36 has a motor output shaft 38, and an input gear 30a of the transmission 32 is coupled to the motor output shaft 38 for rotation therewith. The transmission 32 is configured to transmit rotary power between the input gear 30a and an output gear 30b. In its most simple form, the input gear 30a directly meshingly engages the output gear 30b. In the example provided, the transmission 32 is configured in a manner that is disclosed in commonly assigned U.S. Pat. No. 11,293,534, the disclosure of which is incorporated by reference as if fully set forth in detail herein. It will be appreciated that the transmission 32 could be configured differently from that which is illustrated and described herein. The differential assembly 34 includes a differential input member 40, which can be coupled to the output gear 30b for rotation therewith, and a pair of differential output members 42 (only one shown) that can be rotatable relative to the differential input member 40. As shown, the differential input member 40 is a differential case that houses a differential gearset, and the differential output members 42 are a pair of side gears in the differential gearset. Each of the differential output members 42 can be coupled to a respective output shaft (not shown) for common rotation about an output axis.

A predetermined volume of the lubricant 16 can be disposed in the sump 26 in the housing 12. The output gear 30b can extend into the sump 26 such that the output gear 30b rotates through the lubricant 16 in the sump 26 during the operation of the vehicle driveline component 10. A shroud 50 can be disposed about the output gear 30b to limit the amount of the lubricant 16 in the sump 26 that is able to come into contact with the output gear 30b. Additionally or alternatively, a pump (not specifically shown) can be employed to draw lubricant 16 from the sump 26 and provide a supply of pressurized lubricant 16 that can be directed through the housing 12 to lubricate various components, such as bearings (not specifically shown) and gears, and/or to cool various components such as a stator 54 and a rotor 56 of the electric motor 36. It will be appreciated that the lubricant 16 that has been employed to lubricate and/or cool the various components of the vehicle driveline component 10 can be slung from a rotating component (e.g., the gears or the differential assembly 34 of the rotary power transmission system 14) and/or can drain onto an internal surface 22 of the housing 12 as the lubricant 16 is returned to the sump 26.

The lubrication de-aerator 18 is received in the cavity 24 in the housing 12 and may optionally extend into the sump 26. The lubrication de-aerator 18 is disposed in a location that is configured to intercept the lubricant 16 that is being returned to the sump 26. In this regard, the lubrication de-aerator 18 is positioned to intercept the lubricant 16 that is slung from the rotary power transmission system 14 before the slung lubricant 16 reaches and co-mingles with lubricant 16 that is disposed in the sump 26.

With reference to FIGS. 4 through 7, the lubrication de-aerator 18 has at least one matrix 60 of de-aeration cells 62. Each matrix 60 can be formed from a suitable material, such as a plastic material, and can be formed in a suitable process, such as injection molding. Each matrix 60 can have an upper surface 66 and a lower surface 68, and the de-aeration cells 62 in the matrix 60 can extend between the upper and lower surfaces 66 and 68. Each of the de-aeration cells 62 has a cell inlet 70, which is formed through the upper surface 66, and a cell outlet 72 that is formed through the lower surface 68. Each of the de-aeration cells 62 has a longitudinal axis 78 and tapers along its longitudinal axis 78 between its cell inlet 70 and its cell outlet 72. Each of the de-aeration cells 62 has a non-circular cross-sectional shape in a cross-section that is taken perpendicular to its longitudinal axis 78, such as a hexagonal cross-sectional shape.

In the example provided, the lubrication de-aerator 18 has a plurality of matrices 60 of de-aeration cells 62 that are spaced vertically from one another. Preferably, the lubrication de-aerator 18 is configured so that vertically adjacent matrices 60 are offset from one another such the cell outlets 72 of each pair of vertically adjacent matrices 60 are not vertically in-line with one another. Also preferably, each of the matrices 60 are offset from one another such the cell inlets 70 of each pair of vertically adjacent matrices 60 are not vertically in-line with one another.

With reference to FIGS. 6 through 9, the vertically adjacent matrices 60 can be spaced apart by a plurality of legs 80. Each of the legs 80 has a first end 82, which is received into a leg aperture 84 formed into a first one of the matrices 60, and second end 86 that is received into an associated one of the de-aeration cells 62 in a second, vertically adjacent one of the matrices 60. Optionally, the second end 86 of each of the legs 80 can be configured to both contact an interior surface 90 of an associated one of the de-aeration cells 62 and cooperate with the interior surface 90 of the associated one of the de-aeration cells 62 to form at least one drain channel 92 that extends between an outer surface of the second end 86 and the interior surface 90 to thereby permit lubricant 16 entering the associated one of the de-aeration cells 62 to drain around the second end 86 of the leg 80 to the cell outlet 72 of the associated one of the de-aeration cells 62.

Figure 7:
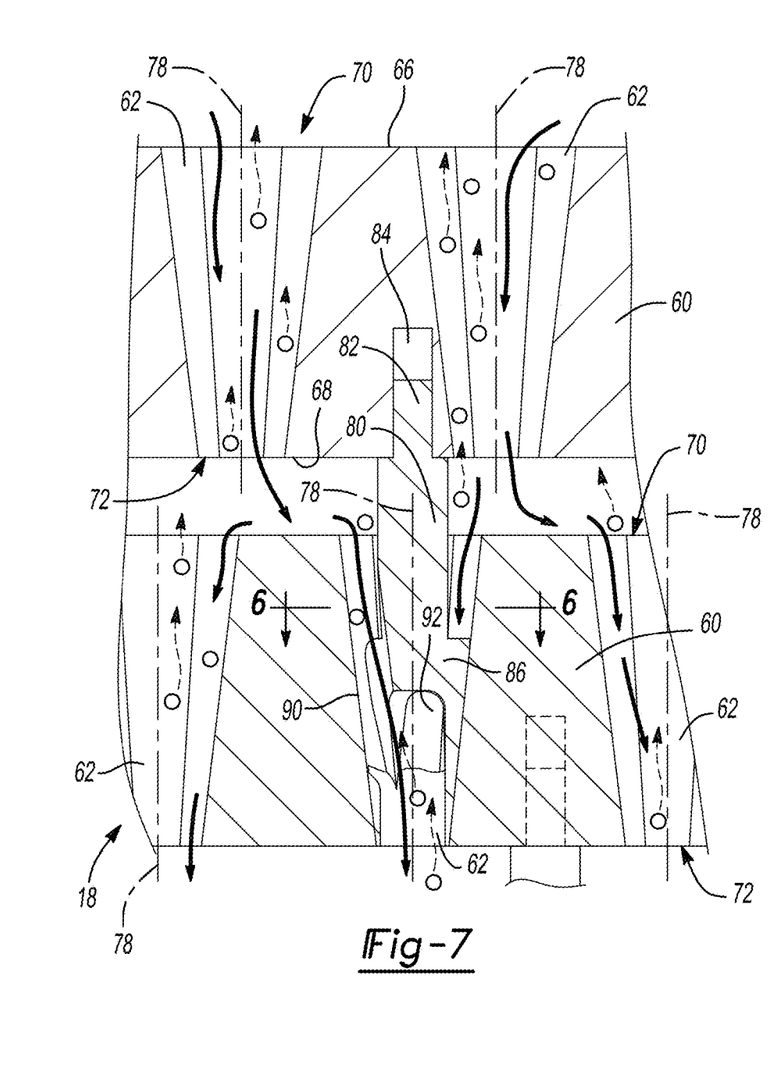
FIG. 7 is a section view of a portion of the lubrication de-aerator taken along the longitudinal axes of a plurality of the de-aeration cells.
Figure 8:
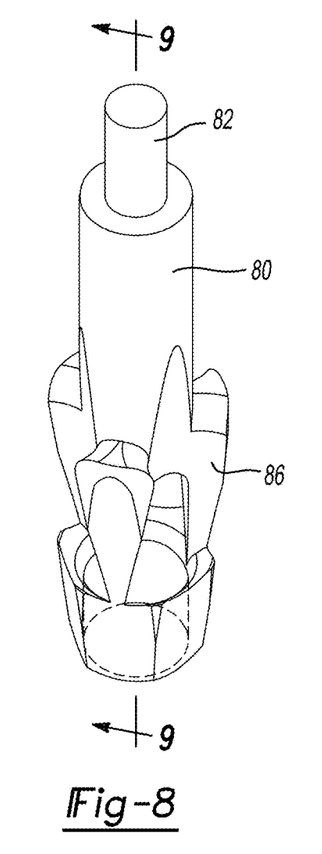
FIG. 8 is a perspective view of the leg of the lubrication de-aerator.
Figure 9:
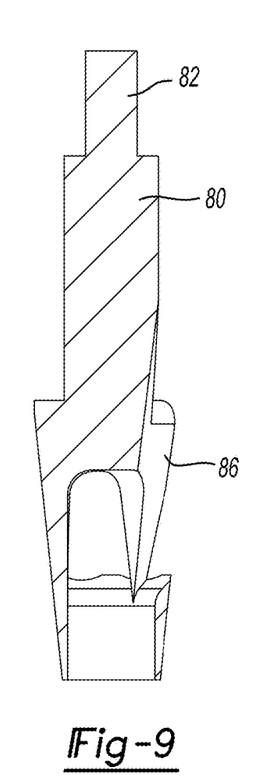
FIG. 9 is a longitudinal section view of the leg.

With reference to FIGS. 2, 3 and 7, lubricant 16 is slung from one or more of the rotating components of the rotary power transmission system 14 and is received onto the upper surface 66 of a first matrix 60 of the lubrication de-aerator 18, where it can spread across the upper surface 66 of the first matrix 60 before draining into the cell inlets 70 of the de-aeration cells 62 that are formed in the first matrix 60. The lubricant 16 entering a cell inlet 70 can spread about the tapered surface of the de-aeration cell 62 before draining through the cell outlet 72. The distribution of the lubricant 16 over the upper surface 66 of the first matrix 60 and over the tapered surfaces of the de-aeration cells 62 in the first matrix 60 spreads the lubricant 16 over a relatively large area and increases the time that that is needed to return the draining lubricant 16 to the sump 26. The spreading of the draining lubricant 16 and the additional time that is needed to return the draining lubricant 16 to the sump 26 facilitate the de-entrainment of air from the draining lubricant 16. Moreover, in situations where one or more larger bubbles (e.g., foam) are present in the lubricant 16 that enters one of the de-aeriation cells 62, the tapered configuration of the de-aeriation cells 62 tends to hold the bubble(s) while permitting the lubricant 16 to drain out of the cell outlet 72. In FIG. 7, the draining lubricant 16 is depicted with solid arrows, while the de-entrained air is depicted as circles.

Lubricant passing out of the cell outlets 72 of the de-aeration cells 62 in the first matrix 60 can be directed to either the upper surface 66 of a vertically adjacent matrix 60 or to the sump 26 in the absence of a vertically adjacent matrix 60. It will be appreciated that the lubricant 16 will spread over the upper surface 66 of the vertically adjacent matrix 60, as well as over the tapered surfaces of the de-aeration cells 62 in the vertically adjacent matrix 60 before exiting through the cell outlets 72 of the de-aeration cells 62 in the vertically adjacent matrix 60. Accordingly, each vertically adjacent matrix 60 of de-aeration cells 62 can repeat the spreading of the draining lubricant 16 and increase the time needed to return the draining lubricant 16 to the sump 26 to thereby further facilitate the de-entrainment of air from the draining lubricant 16.

It will be appreciated that the lubrication de-aerator 18 significantly slows or stills the lubricant 16 in the sump 26 as well as shields the lubricant 16 in the sump 26 from lubricant that is slung or surges from the rotating components of the rotary power transmission system 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
   a housing that defines a cavity and a sump, the housing having a plurality of internal surfaces;
   a rotary power transmission system received in the cavity, the rotary power transmission system including a plurality of gears that are in meshing engagement;
   a lubricant received in the sump, the lubricant being employed to lubricate the rotary power transmission system; and
   a lubrication de-aerator received in the housing at a location that receives lubricant slung from the rotary power transmission system, the lubrication de-aerator having at least one matrix of de-aeration cells that extend between an upper surface and a lower surface, each of the de-aeration cells having a cell inlet, which is formed through the upper surface, and a cell outlet that is formed through the lower surface, each of the de-aeration cells tapering between its cell inlet and its cell outlet.

2. The vehicle driveline component of claim 1, wherein the lubrication de-aerator has a plurality of matrices of de-aeration cells, wherein the matrices of de-aeration cells are spaced vertically from one another.

3. The vehicle driveline component of claim 2, wherein vertically adjacent matrices of de-aeration cells are offset from one another such the cell outlets of each pair of vertically adjacent matrices are not vertically in-line with one another.

4. The vehicle driveline component of claim 3, wherein each of the de-aeration cells has a longitudinal axis, and wherein each of the matrices are offset from one another such the cell inlets of each pair of vertically adjacent matrices are not vertically in-line with one another.

5. The vehicle driveline component of claim 1, wherein the vertically adjacent matrices of de-aeration cells are spaced apart by a plurality of legs, each of the legs having a first end, which is received into a leg aperture formed into a first one of the matrices of de-aeration cells, and second end that is received into an associated one of the de-aeration cells in a second one of the matrices of de-aeration cells.

6. The vehicle driveline component of claim 5, wherein the second end of each of the legs contacts an interior surface of an associated one of the de-aeration cells and wherein at least one drain channel is formed between the second end and the interior surface that permits the lubricant to drain around the second end to the cell outlet of the associated one of the de-aeration cells.

7. The vehicle driveline component of claim 1, wherein each of the de-aeration cells has a longitudinal axis, and wherein each of the de-aeration cells has a non-circular cross-sectional shape in a cross-section taken perpendicular to the longitudinal axis.

8. The vehicle driveline component of claim 7, wherein the non-circular cross-sectional shape is hexagonal.

9. The vehicle driveline component of claim 1, wherein at least one of the plurality of gears rotates through the lubricant in the sump during operation of the vehicle driveline component.

10. The vehicle driveline component of claim 1, further comprising an electric motor received in the housing, the electric motor having a motor output shaft, and wherein one of the plurality of gears is coupled to the motor output shaft for rotation therewith.

11. The vehicle driveline component of claim 1, wherein the rotary power transmission system includes a differential assembly.

12. A vehicle driveline component comprising:
a housing defining a cavity and a sump;
a rotary power transmission system received in the cavity, the rotary power transmission system including a plurality of gears that are in meshing engagement;
a lubricant received in the sump, the lubricant being employed to lubricate the rotary power transmission system; and
a lubrication de-aerator received in the cavity, the lubrication de-aerator having a plurality of matrices of de-aeration cells that are spaced vertically apart from one another, each matrix of de-aeration cells having a plurality of de-aeration cells that extend between an upper surface and a lower surface, each of the de-aeration cells having a cell inlet, which is formed through the upper surface, and a cell outlet that is formed through the lower surface, each of the de-aeration cells tapering between its cell inlet and its cell outlet;
wherein vertically adjacent matrices of de-aeration cells are offset from one another such the cell outlets of each pair of vertically adjacent matrices are not vertically in-line with one another;
wherein each of the de-aeration cells has a longitudinal axis, and wherein each of the matrices are offset from one another such the cell inlets of each pair of vertically adjacent matrices are not vertically in-line with one another; and
wherein each of the de-aeration cells has a non-circular cross-sectional shape in a cross-section taken perpendicular to the longitudinal axis.

13. The vehicle driveline component of claim 12, wherein the vertically adjacent matrices of de-aeration cells are spaced apart by a plurality of legs, each of the legs having a first end, which is received into a leg aperture formed into a first one of the matrices of de-aeration cells, and second end that is received into an associated one of the de-aeration cells in a second one of the matrices of de-aeration cells.

14. The vehicle driveline component of claim 13, wherein the second end of each of the legs contacts an interior surface of an associated one of the de-aeration cells and wherein at least one drain channel is formed between the second end and the interior surface that permits the lubricant to drain around the second end to the cell outlet of the associated one of the de-aeration cells.

15. The vehicle driveline component of claim 12, wherein the non-circular cross-sectional shape is hexagonal.

16. The vehicle driveline component of claim 12, wherein at least one of the plurality of gears rotates through the lubricant in the sump during operation of the vehicle driveline component.

17. The vehicle driveline component of claim 12, further comprising an electric motor received in the housing, the electric motor having a motor output shaft, and wherein one of the plurality of gears is coupled to the motor output shaft for rotation therewith.

18. The vehicle driveline component of claim 12, wherein the rotary power transmission system includes a differential assembly.

* * * * *